United States Patent
Liu et al.

(10) Patent No.: US 12,346,751 B2
(45) Date of Patent: Jul. 1, 2025

(54) COMPUTER DEVICE AND MANAGEMENT METHOD

(71) Applicant: HUAWEI TECHNOLOGIES CO., LTD., Guangdong (CN)

(72) Inventors: Xingsen Liu, Dongguan (CN); Tongling Song, Shenzhen (CN); Yuanjun Niu, Xi'an (CN); An Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/298,739

(22) Filed: Apr. 11, 2023

(65) Prior Publication Data

US 2023/0244550 A1  Aug. 3, 2023

Related U.S. Application Data

(63) Continuation of application No. PCT/CN2021/124249, filed on Oct. 16, 2021.

(30) Foreign Application Priority Data

Oct. 16, 2020 (CN) .......................... 202011112672.3

(51) Int. Cl.
- *G06F 9/52* (2006.01)
- *G06F 9/50* (2006.01)
- *G06F 15/177* (2006.01)

(52) U.S. Cl.
CPC .............. *G06F 9/52* (2013.01); *G06F 15/177* (2013.01); *G06F 9/50* (2013.01); *G06F 2209/522* (2013.01)

(58) Field of Classification Search
CPC .... G06F 15/177; G06F 2209/522; G06F 9/50; G06F 9/52
See application file for complete search history.

(56) References Cited

U.S. PATENT DOCUMENTS

| | | | |
|---|---|---|---|
| 2009/0296342 A1* | 12/2009 | Matteson | G06F 1/206 361/679.46 |
| 2012/0324088 A1* | 12/2012 | Zhou | H04L 41/00 709/223 |
| 2012/0324246 A1* | 12/2012 | Rahardjo | G06F 1/26 713/300 |

(Continued)

FOREIGN PATENT DOCUMENTS

| CN | 1863081 A | 11/2006 |
|---|---|---|
| CN | 102187640 A | 9/2011 |

(Continued)

OTHER PUBLICATIONS

International Search Report and Written Opinion in International Appln. No. PCT/CN2021/124249, mailed on Jan. 19, 2022, 18 pages (with English translation).

*Primary Examiner* — Terrell S Johnson
(74) *Attorney, Agent, or Firm* — Fish & Richardson P.C.

(57) ABSTRACT

Computer devices and management methods are provided. In an implementation, a computer device includes a subrack common component and a plurality of service nodes, wherein each of the plurality of service nodes comprises a baseboard management controller (BMC connected to the subrack common component and configured to manage the subrack common component when being in a primary status.

20 Claims, 9 Drawing Sheets

(56) References Cited

U.S. PATENT DOCUMENTS

2016/0078342 A1 3/2016 Tang
2019/0286590 A1* 9/2019 Chou .................... G06F 13/362

FOREIGN PATENT DOCUMENTS

| CN | 102571452 A | 7/2012 |
| CN | 104506362 A | 4/2015 |
| CN | 105549696 A | 5/2016 |

* cited by examiner

COMPUTER DEVICE AND MANAGEMENT METHOD

CROSS-REFERENCE TO RELATED APPLICATIONS

This application is a continuation of International Patent Application No. PCT/CN2021/124249, filed on Oct. 16, 2021, which claims priority to Chinese Patent Application No. 202011112672.3, filed on Oct. 16, 2020. The disclosures of the aforementioned applications are hereby incorporated by reference in their entireties.

TECHNICAL FIELD

The present invention relates to the computer field, and in particular, to a computer device and a management method.

BACKGROUND

A conventional computer device, for example, a computer device in an advanced telecommunications computing architecture (ATCA) form, is provided with independent slots of service nodes and management nodes in different forms. The service nodes are configured to process customer services. The management nodes are configured to manage subrack common components, for example, a fan and a power supply, and are further configured to monitor statuses of all nodes in a subrack.

However, as integration of a current computer device is increasingly high, and a subrack is miniaturized, a requirement for space utilization efficiency of the subrack is greatly improved. However, a management node responsible for managing the computer device still occupies dedicated independent space, and space utilization of the computer device cannot be further improved. In addition, currently, hardware forms of subracks of multi-node computer devices are diversified, forms of management nodes of different subracks cannot be unified, and each management node needs to be developed separately. As a result, development and maintenance costs of software and hardware of the computer device are greatly increased.

SUMMARY

This application provides a computer device management method and a system. In a technical solution in which a service node is used to replace a management node to manage a computer device, the service node is used to replace the management node to manage the computer device, so that integration of the computer device can be effectively improved, and development work of the management node can be omitted.

According to a first aspect, this application provides a computer device. The computer device includes a subrack common component and a plurality of service nodes, each service node includes a baseboard management controller (BMC), and the BMC is connected to the subrack common component. The BMC of the service node is directly connected to the subrack common component, so that the service node can directly manage the subrack common component. In this way, an independent management node is not required, space utilization of the computer device is greatly improved, and work of developing the independent management node is omitted.

In a feasible implementation, a BMC of any service node in the plurality of service nodes is configured to manage the subrack common component when being in a primary status. Only the BMC of the service node in the primary status has the permission to manage the subrack common component. This can effectively prevent operation conflicts that may occur when the plurality of service nodes simultaneously manage the subrack common component.

In a feasible implementation, the BMC of any service node in the plurality of service nodes is further configured to manage the plurality of service nodes when being in the primary status. The service node in the primary status may further manage all service nodes, to ensure that the service node in the primary status can manage the entire computer device, thereby implementing management of the entire computer device.

In a feasible implementation, the BMC of each service node is further configured to run a first management submodule and a second management submodule. The first management submodule is configured to manage and run the service node; a state of the second management submodule includes: a working state and a standby state; and when the second management submodule is in the working state, the second management submodule is configured to manage the subrack common component and a service node other than the service node.

In a feasible implementation, when the running second management submodule is in the working state, the BMC of the service node is in the primary status; and when the running second management submodule is in the standby state, the BMC of the service node is in a secondary status.

In a feasible implementation, BMCs of any two service nodes in the plurality of service nodes are connected to each other, and any service node in the plurality of service nodes is accessed by a user to manage the computer device. In the technical solution, it can be ensured that when a status of a service node changes, the user does not need to go to the site to replug a cable to an interface of a new service node in the primary status, to manage the computer device.

In a feasible implementation, each service node further includes a logic circuit, logic circuits of any two service nodes in the plurality of service nodes are connected to each other, and the logic circuit is configured to obtain status information of the plurality of service nodes. The logic circuit can quickly process a status-related electrical signal, obtain status information, and continuously refresh the status information. The logic circuits of any two service nodes are connected to each other, to ensure that status information of any two service nodes is quickly synchronized.

In a feasible implementation, the logic circuit includes a complex programmable logic device (CPLD), a local area network switching device, or a controller area network circuit (CAN) circuit.

In a feasible implementation, a manner in which the logic circuits of any two service nodes in the plurality of service nodes are connected to each other includes: full interconnection or bus interconnection.

In a feasible implementation, the plurality of service nodes are further configured to: when no BMC of a service node in the plurality of service nodes is in the primary status, select a BMC of a service node to enter the primary status according to a master election rule. According to the master election rule, a BMC of a service node is quickly selected to enter the primary status, to manage the computer device, thereby preventing an exception of the computer device due to lack of a management operation.

In a feasible implementation, the plurality of service nodes are further configured to: when the service node to which the BMC in the primary status belongs is abnormal, or when the BMC of the service node in the primary status applies for state switching, select a BMC of a service node to enter the primary status according to a master election rule. According to the technical solution, when the service node in the primary status cannot continue to perform a management operation, another service node can quickly take over a management task, to ensure proper running of a service of the computer device.

According to a second aspect, this application provides a management method for a computer device. The computer device includes a subrack common component and a plurality of service nodes, each service node includes a baseboard management controller BMC, and the BMC is connected to the subrack common component. The management method includes: when being in a primary status, a BMC of any service node in the plurality of service nodes manages the subrack common component. The BMC of the service node is directly connected to the subrack common component, so that the service node can directly manage the subrack common component. In this way, an independent management node is not required, space utilization of the computer device is greatly improved, and work of developing the independent management node is omitted. Only the BMC of the service node in the primary status has the permission to manage the subrack common component. This can effectively prevent operation conflicts that may occur when the plurality of service nodes simultaneously manage the subrack common component.

In a feasible implementation, the BMC of any service node in the plurality of service nodes further manages the plurality of service nodes when being in the primary status. The service node in the primary status may further manage all service nodes, to ensure that the service node in the primary status can manage the entire computer device, thereby implementing management of the entire computer device.

In a feasible implementation, the BMC of each service node further runs a first management submodule and a second management submodule. The first management submodule manages the service node; a state of the second management submodule includes: a working state and a standby state; and when the second management submodule is in the working state, the second management submodule manages the subrack common component and a service node other than the service node.

In a feasible implementation, when the second management submodule is in the working state, the BMC of the service node is in the primary status; and when the second management submodule is in the standby state, the BMC of the service node is in a secondary status.

In a feasible implementation, BMCs of any two service nodes in the plurality of service nodes are connected to each other, and any service node in the plurality of service nodes is accessed to manage the computer device. In the technical solution, it can be ensured that when a status of a service node changes, the user does not need to go to the site to replug a cable to an interface of a new service node in the primary status, to manage the computer device.

In a feasible implementation, each service node further includes a logic circuit, logic circuits of any two service nodes in the plurality of service nodes are connected to each other, and the logic circuit obtains status information of the plurality of service nodes. The logic circuit can quickly process a status-related electrical signal, obtain status information, and continuously refresh the status information. The logic circuits of any two service nodes are connected to each other, to ensure that status information of any two service nodes is quickly synchronized.

In a feasible implementation, when no BMC of a service node in the plurality of service nodes is in the primary status, a BMC of a service node is selected to enter the primary status according to a master election rule. According to the master election rule, a BMC of a service node is quickly selected to enter the primary status, to manage the computer device, thereby preventing an exception of the computer device due to lack of a management operation.

In a feasible implementation, when the service node to which the BMC in the primary status belongs is abnormal, or when the BMC of the service node in the primary status applies for state switching, a BMC of a service node is selected to enter the primary status according to a master election rule. According to the technical solution, when the service node in the primary status cannot continue to perform a management operation, another service node can quickly take over a management task, to ensure proper running of a service of the computer device.

In a feasible implementation, the master election rule includes: If statistics on votes are collected, a service node that obtains a largest quantity of votes enters the primary status; and when a same quantity of votes are obtained, a service node that has a smallest slot number enters the primary status.

According to a third aspect, this application provides a computer-readable storage medium. The computer-readable storage medium stores computer instructions. When the computer instructions in the computer-readable storage medium are executed by a computer device, the computer device is enabled to perform the method in any feasible implementation of the second aspect, or the computer device is enabled to implement a function of the computer device in any feasible implementation of the first aspect.

DESCRIPTION OF EMBODIMENTS

Figure 1:
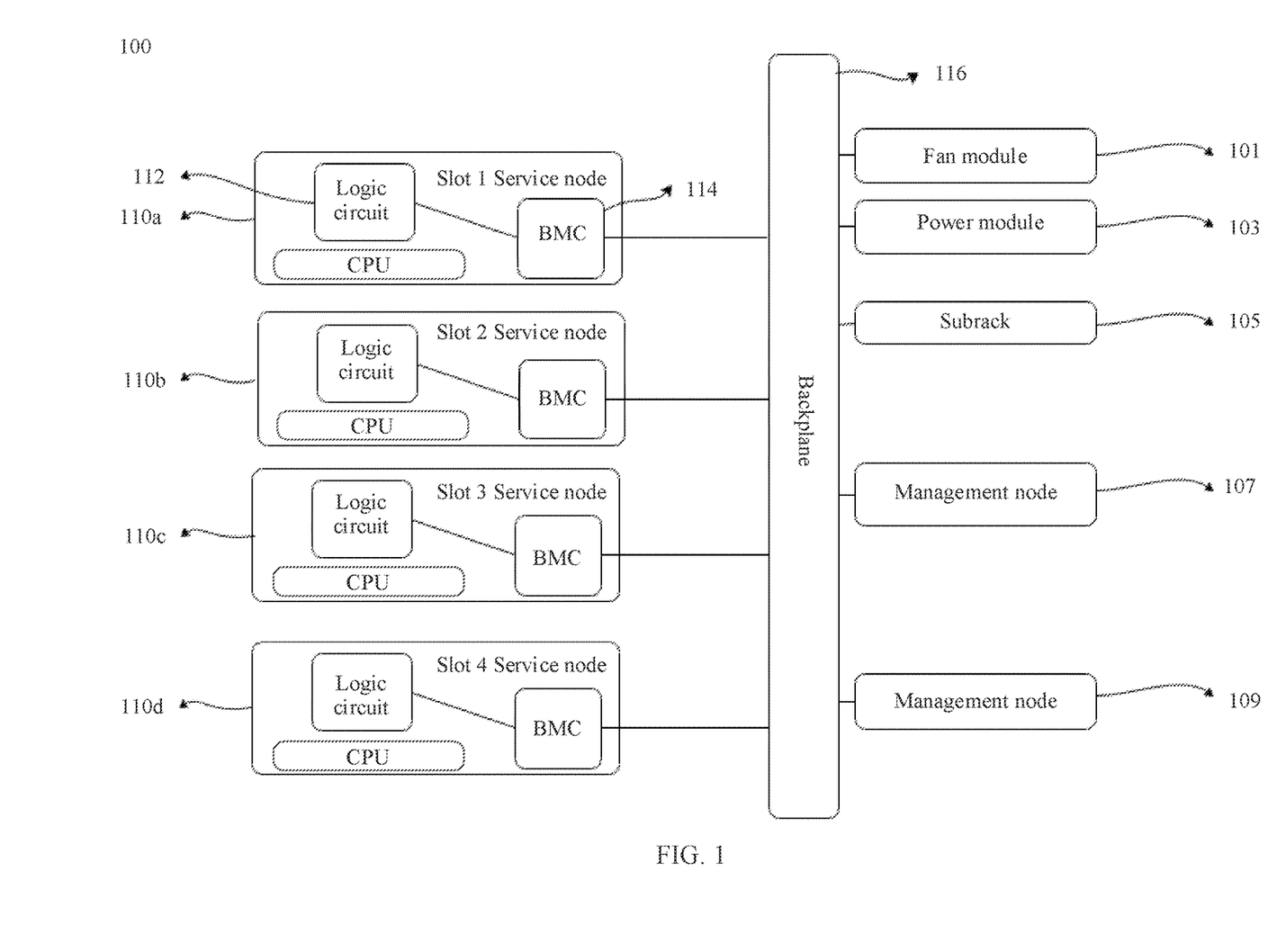
FIG. 1 is a schematic diagram of a structure of a computer device in the conventional technology.

In the field of computer device management, how to efficiently and accurately manage a computer device and ensure that a service running on the computer device by a customer is not affected has always been an important problem. A computer device in an ATCA form is a computer device in an existing management architecture. The computer device in this form mainly includes two independent management nodes that work in active/standby mode. The management nodes manage all nodes and subrack common components. FIG. 1 is a schematic diagram of a structure of a computer device in an ATCA form. FIG. 1 is used as an example. A computer device 100 has four service nodes 110a, 110b, 110c, and 110d. Each service node has a same hardware structure. As shown in the service node 110a, the service node 110a includes a logic circuit 112 and a BMC 114. The logic circuit 112 is configured to: detect a voltage signal and a bus signal that indicate a status of the node, obtain status information of the node, communicate with the BMC 114, and receive and transfer the status information. The BMC 114 obtains the status information of the node based on a detection result of the logic circuit and a direct detection result of the BMC 114 on the node, and manages the node. When a management node 107 is in an active state, a management node 109 is in a standby state. The BMC 114 transfers management information of the node 110a to the management node 107 through a backplane 116. Similarly, a BMC of another service node also transfers management information of the node to the management node 107 through the backplane 116. In addition, for subrack common components such as a fan module 101, a power module 103, and a subrack 105, the management node 107 in the active state also obtains status information of the subrack common components, and manages the subrack common components. For example, an air speed of the fan module 101 is adjusted based on temperature information of the computer device 100, and supply power of the power module 103 is adjusted based on power consumption information of the computer device 100.

The management node 107 and the management node 109 work in active/standby mode. When the management node 107 is in the active state, the management node 107 has management rights of the entire computer device 100. In this case, the management node 109 is in the standby state and has no management rights of the entire computer device 100. However, when a problem such as an exception occurs on the management node 107, the management node 109 is upgraded to the active state, so as to replace the management node 107 to manage the computer device.

The management nodes 107 and 109 have independent hardware forms, and are different from the service nodes 110a, 110b, 110c, and 110d. In addition, the management nodes 107 and 109 independently occupy two slots in the subrack 116. As a result, integration and space utilization of the computer device 100 are low. Independent development and maintenance of the management nodes increase costs.

Figure 2:
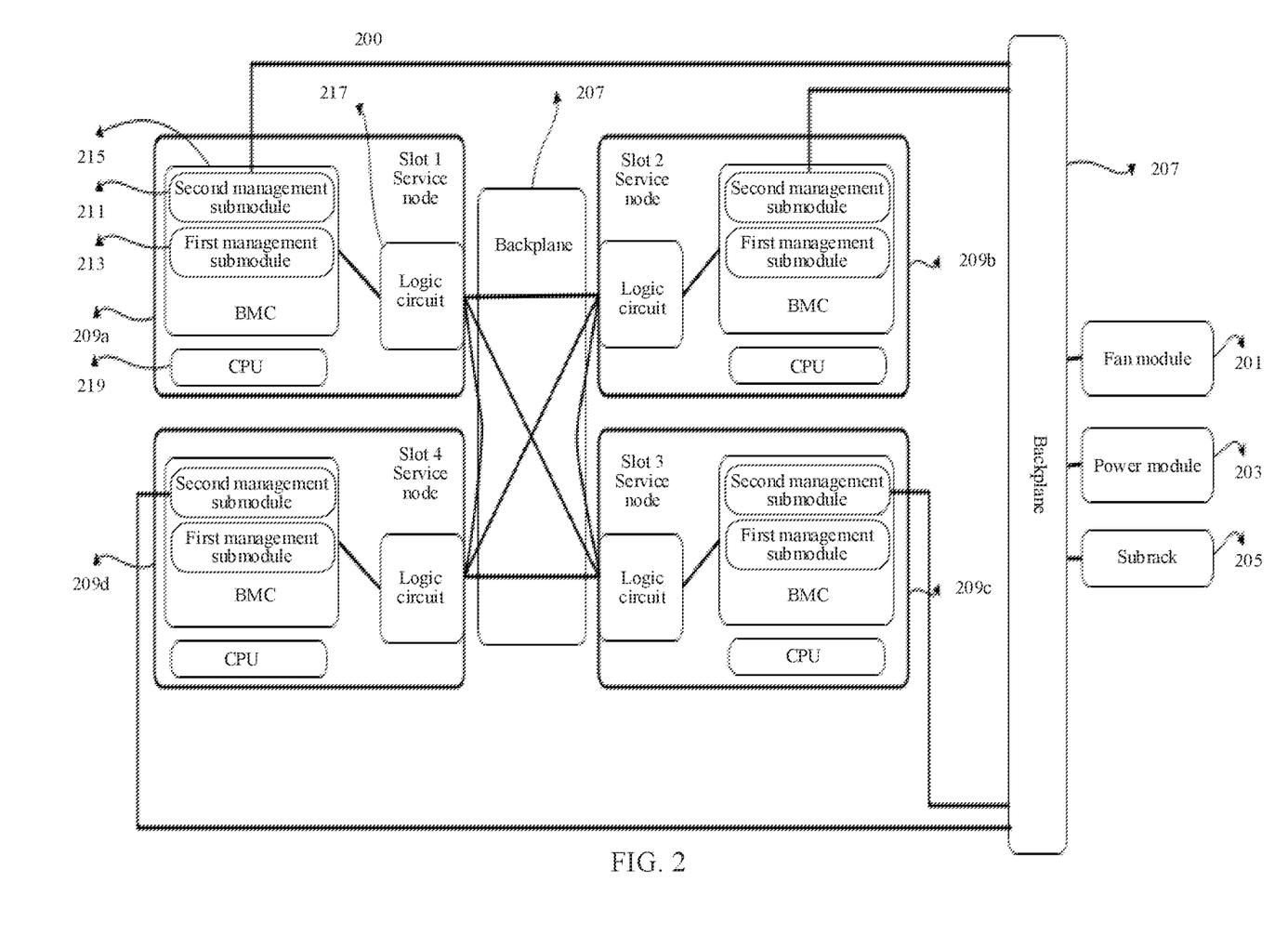
FIG. 2 is a schematic diagram of a structure of a computer device according to an embodiment of this application.

Therefore, this application provides a feasible technical solution. FIG. 2 is a schematic diagram of a structure of a computer device 200 according to an embodiment of this application. The computer device 200 has four service nodes 209a, 209b, 209c, and 209d, a backplane 207, a fan module 201, a power module 203, and a subrack 205, but does not have an independent management node.

Each service node has a same hardware structure. The service node 209a is used as an example. The service node 209a includes a hardware circuit 217, a BMC 215, and a CPU 219. After being powered on and started, the BMC 215 runs a first management submodule 213 and a second management submodule 211.

The BMC 215 is connected to all other service nodes and subrack common components through the backplane 207, including the fan module 201, the power module 203, the subrack 205, and the like. Herein, the connection refers to a direct bus connection. Through the direct bus connection, the BMC 215 can directly perform information collection, status check, management operations, and the like on all nodes and all components of the entire computer device 200. It may be understood that the direct bus connection does not exclude a drive chip, a routing circuit, and the like that may appear on the bus. A bus connection including the chip and circuit is also a direct bus connection.

The logic circuit 217 is configured to detect and obtain status information of the service node 209a, is connected to logic circuits of all other service nodes such as the service nodes 209b, 209c, and 209d in a full interconnection manner, and can obtain status information of all other service nodes. The status information includes primary-secondary status information, in-position information, health status information, heartbeat information, arbitration voting information, and the like. In the full interconnection manner, it is ensured that logic circuits of any two service nodes in all the service nodes can perform direct communication and exchange status information of each service node.

It may be understood that, in addition to the full interconnection manner, a bus manner may alternatively be used to ensure that logic circuits of any two service nodes are directly connected, perform direct communication, and exchange status information.

The logic circuit 217 may be implemented in a plurality of manners. One feasible manner is a CPLD, and another feasible manner includes: a local area network switch LAN switch chip, or a CAN circuit.

After being powered on and started, the BMC 215 runs the first management submodule 211 and the second management submodule 213. The first management submodule 213 is configured to manage the service node, and the second management submodule 211 is configured to manage other service nodes than the service node and all subrack common components.

The logic circuit 217 is connected to the BMC 215 through the bus, and communicates with the BMC 215 to exchange node status information and a management operation instruction.

It may be easily understood that the hardware structure of the service node 209a further includes hardware components such as a storage medium, some buses, and the like, which are not shown in FIG. 2.

The service nodes 209a, 209b, 209c, and 209d have a same hardware structure, and all have a capability of managing the entire computer device 200. However, a management operation can be performed on the entire computer device 200 only when a BMC of one of the service nodes is in a primary status after being started and running. In this case, BMCs of other service nodes are in a secondary status, and the secondary status represents that a management operation cannot be performed on the entire computer device 200. The secondary status further represents that when the service node in the primary status cannot continue to perform the management operation, the service node in the secondary status serves as a backup and switches to the primary status, and then performs the management operation on the entire computer device 200. Details are described later.

For example, the service node 209a is in the primary status, and the other three service nodes are in the secondary status. When the BMC 215 is in the primary status, the second management submodule 211 is in a working state. The working state means that the subrack common components and other service nodes are being managed. BMCs of the other three service nodes are in the secondary status, and second management submodules of the other three service nodes are in a standby state. The standby state means that the second management module does not manage the subrack common components and other service nodes.

It should be further noted that the technical solution of this application is not limited to the division manner of the first management submodule and the second management submodule in this embodiment. In another feasible embodiment, after a BMC is powered on and started, three submodules may run. A first management submodule manages the node, a second management submodule manages a subrack common component, and a third management submodule manages other service nodes. It may be easily figured out that such function division is not limited to the foregoing two solutions, and examples are not given one by one herein.

It may be understood that, in the embodiment shown in FIG. 2, four service nodes are used as an example. However, in another embodiment, there may be any quantity of service nodes. In addition, a quantity of fan modules and a quantity of power modules are not limited either, and may be any quantity. Some components of the computer device are not provided in the computer device 200 in this embodiment, for example, a switching node and an interface module. It may be easily understood that the computer device 200 also includes these nodes and components.

The foregoing service node is configured to process a customer service. The service node may be a blade server node, a rack server node, a switching node, a storage node, a computing node, or the like. The subrack common components are components that provide subrack common resources, such as the subrack, the power module, the fan module, and the interface module. It is further noted that, when the service node is a rack server node, each service node is connected without using the backplane, and each rack server node may be connected through a cable.

It should be further explained that, when a BMC of a service node is in the primary status, it is equivalent to that the service node is in the primary status, or when a BMC of a service node is in the secondary status, the service node is in the secondary status.

The computer device 200 shown in FIG. 2 may be a blade server device, a switching device including a plurality of switching nodes, a storage device including a plurality of storage nodes, or the like.

Figure 3:
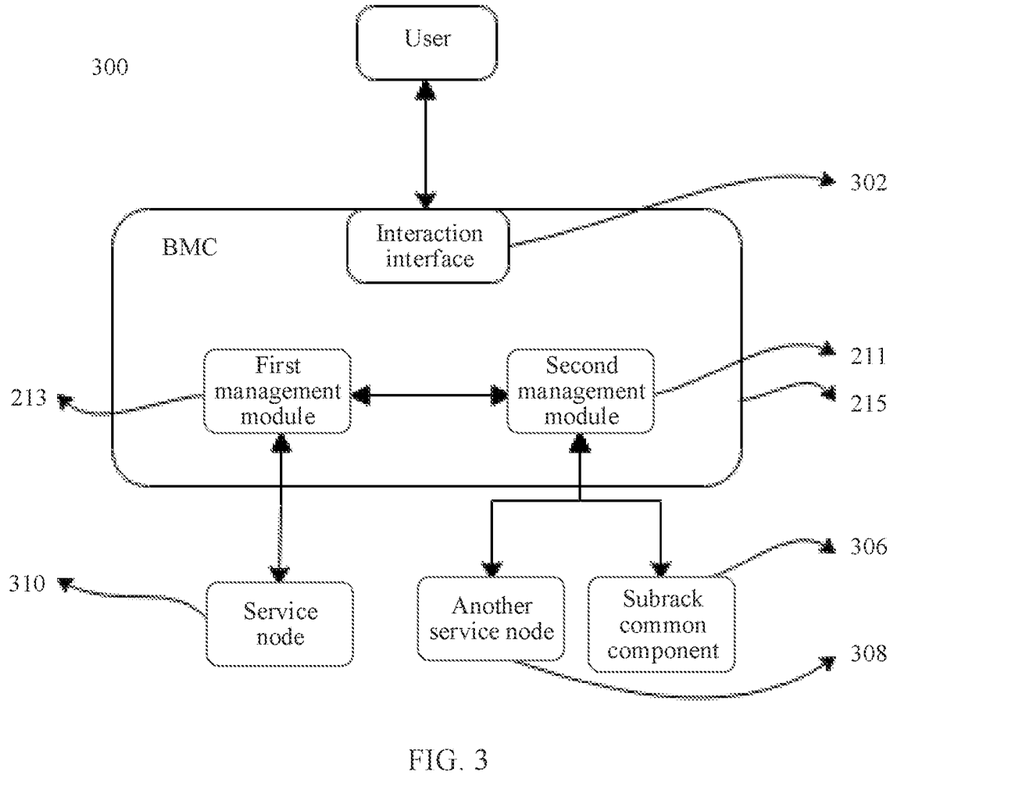
FIG. 3 is a schematic diagram of a structure of a computer device access according to an embodiment of this application.

FIG. 3 is a schematic diagram of a structure 300 of access management performed by a user on the computer device 200. After the BMC 215 is powered on, a first management module 213 and a second management module 211 run. The second management module 211 manages another service node 308 and a subrack common component 306, and the first management module 213 manages a service node 310. The user may manage the entire computer device 200 by accessing an interaction interface 302 of the BMC 215. The interaction interface 302 may be: a simple network management protocol (SNMP), a RedFish (RedFish), an intelligent platform management interface (IPMI), a website Website, a command-line interface (CLI), and the like.

Figure 4:
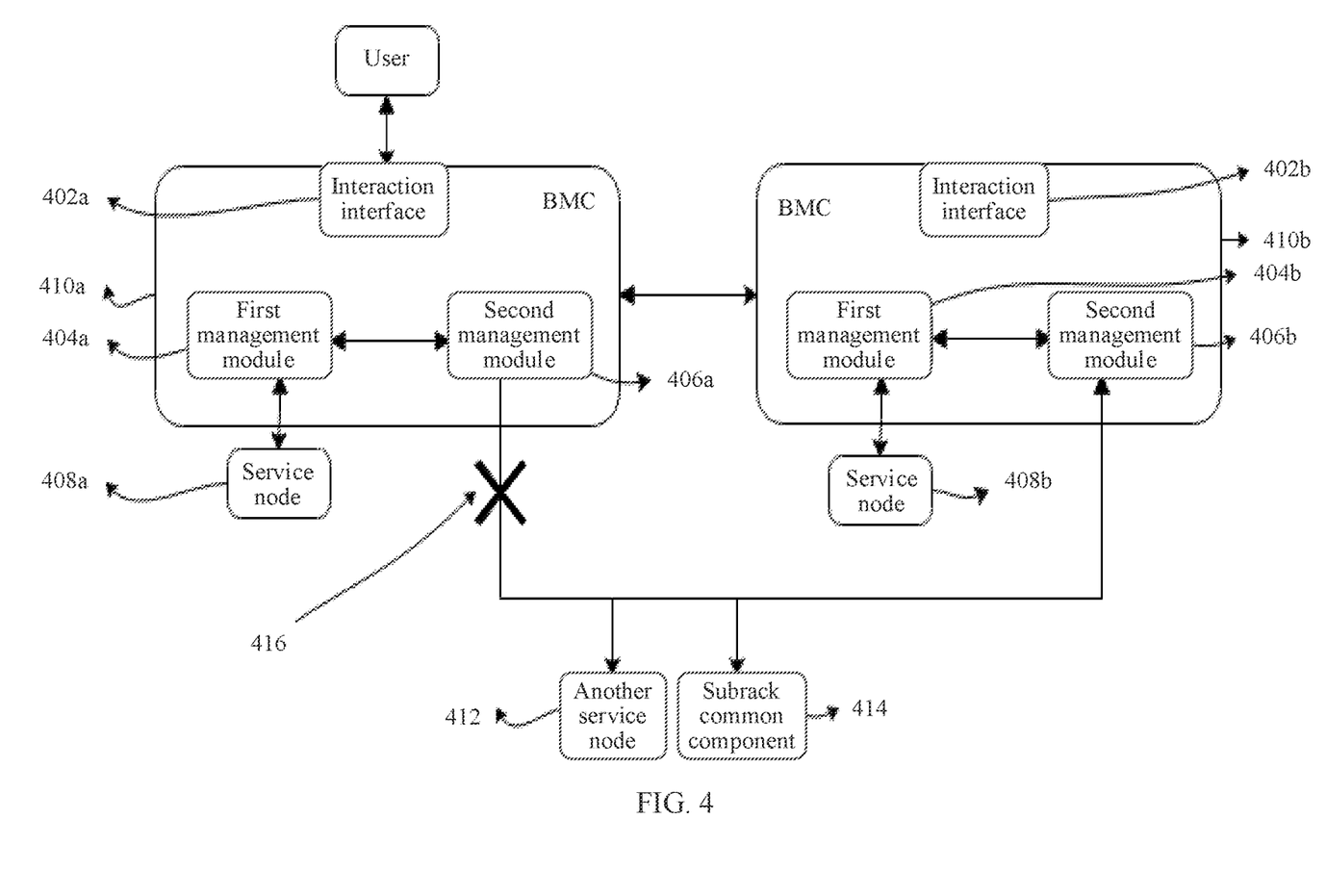
FIG. 4 is a schematic diagram of a structure of another computer device access according to an embodiment of this application.

If a computer has a management node, the user can connect to the management node through a cable, to manage the computer device. There is only an active management node and a standby management node. After both management nodes are connected, even if an active/standby switchover occurs on the management nodes, the computer device can still be remotely accessed and managed without replugging a cable. However, after the management nodes are removed from the computer device, there are usually two superfluous service nodes. For example, in the computer device 200 shown in FIG. 2, there are four service nodes, and it is not an efficient solution for the user to simultaneously access so many service nodes through a cable. An embodiment of this application provides a feasible solution. As shown in FIG. 4, two service nodes are used as an example. BMCs 410a and 410b of the two service nodes are connected. When the BMC 410b starts to run and is in a primary status, a running first management module 404b manages a service node 408b. It should be noted that the service node refers to a service node to which the BMC belongs. A running second management module 406b manages another service node 412 and a subrack common component 414, executes a management operation, and obtains management information. The another service node 412 includes a service node to which the BMC 410a belongs. In this case, a user still accesses an interaction interface 402a. However, because the BMC 410a is connected to the BMC 410b, the user can access the BMC 410b through the interaction interface 402a, access management information of the computer device 200, and perform a management operation on the computer device 200. It should be further explained that a cross 416 shown in FIG. 4 means that a second management module 406a in a standby state does not manage the another service node 412 and the subrack common component 414 at this time. A first management module 404a manages the service node 408a to which the BMC 410a belongs. Because the user does not directly access the BMC 410b, an interaction interface 402b of the BMC 410b may be in an idle state at this time.

Therefore, according to the technical solution provided in the foregoing embodiment, when there are a plurality of service nodes in the computer device 200, the user may access any one of the service nodes, to access and manage the entire computer device 200. The technical solution can effectively avoid a problem that when a status of a service node changes, a cable for user access needs to be manually replugged to a service node in a primary status.

Figure 5:
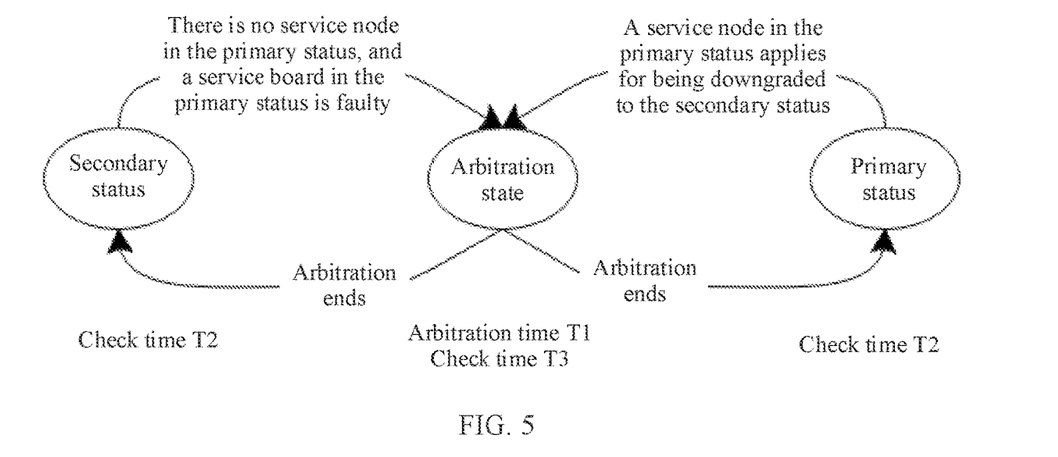
FIG. 5 is a schematic flowchart of switching between a primary status and a secondary status of a service node according to an embodiment of this application.

A status of a service node changes with an actual situation. In other words, the status of the service node changes from a primary status to a secondary status, or changes from a secondary status to a primary status. FIG. 5 is a schematic flowchart of switching caused by a status change of a service node according to an embodiment of this application. When all service nodes are in a secondary status and no service node is in a primary status, or when a service node in the primary status is faulty and a health status is abnormal, all service nodes or all service nodes except the faulty node check the status. After check time T2, the service nodes enter an arbitration state. After arbitration time T1 and check time T3, each service node enters a corresponding status. One service node enters the primary status, and other service nodes enter the secondary status. Alternatively, in a second scenario, if the service node in the primary status applies for being downgraded to the secondary status, all service nodes or all service nodes except the service node that applies for being downgraded to the secondary status check the status. After the check time T2, the service nodes enter the arbitration state. After the arbitration time T1 and the check time T3, each service node enters the corresponding status. One service node enters the primary status, and other service nodes enter the secondary status. It should be further noted that the faulty service node cannot enter the primary status, but the service node that applies for being downgraded to the secondary status may still enter the primary status after arbitration. In addition, it should be explained that degradation means being downgraded to the secondary status.

Figure 6:
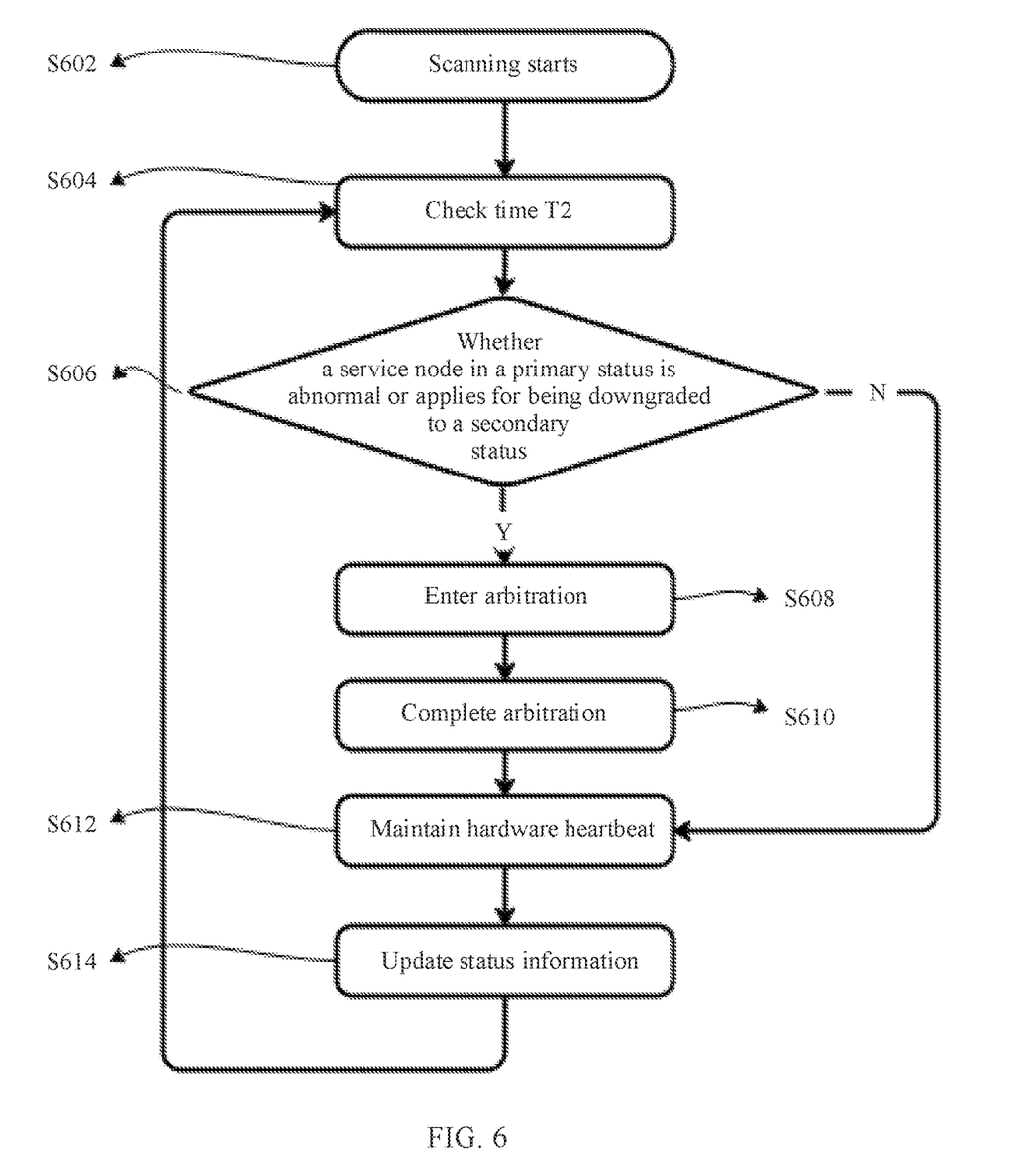
FIG. 6 is a flowchart of a method for periodically detecting status information of a service node in a computer device according to an embodiment of this application.

As shown in FIG. 6, an embodiment of this application provides a feasible technical solution, to avoid a case in which a service node in a primary status is faulty while other service nodes in a secondary status do not discover in time, and select a new service node to enter the primary status through arbitration. Each service node scans status information of the service node and other service nodes in real time, and updates and synchronizes the status information of all nodes in time. A procedure for scanning the node is as follows:

According to step S602 of the procedure, scanning starts.

According to step S604 of the procedure, status information of the service node is scanned and checked for a plurality of times within duration T2.

According to step S606 of the procedure, status information of a service node in a primary status is obtained, and whether the service node is abnormal or whether the service node applies for being downgraded to a secondary status is determined. If a determining result is that the service node is abnormal or that the service node applies for being downgraded to the secondary status, step S608 is performed; or if a determining result is that the service node is normal or that the service node does not apply for being downgraded to the secondary status, step S612 is performed. That the service node is abnormal means that the service node cannot work properly and cannot implement a management operation.

According to step S608 of the procedure, when the status information of the service node in the primary status indicates that the service node is abnormal or applies for being downgraded to the secondary status, all service nodes or all service nodes except the abnormal service node and the service node that applies for being downgraded to the secondary status enter an arbitration state.

According to step S610 of the procedure, the service node entering the arbitration state completes an arbitration operation, and the node obtains an arbitration result.

According to step S612 of the procedure, hardware heartbeat of the node is maintained, to notify other service nodes of a health status of the node.

According to step S614 of the procedure, status information of the node is updated, and the node remains in the secondary status or enters the primary status based on the arbitration result. Back to step S604 to perform scanning and check operations whose duration is T2 in a next phase.

According to the foregoing technical solution in which status information of all nodes is repeatedly scanned in real time, working statuses of all service nodes are monitored, to ensure that a computer device has a service node that works properly and is in the primary status, and ensure proper running of a service of a user.

Figure 7:
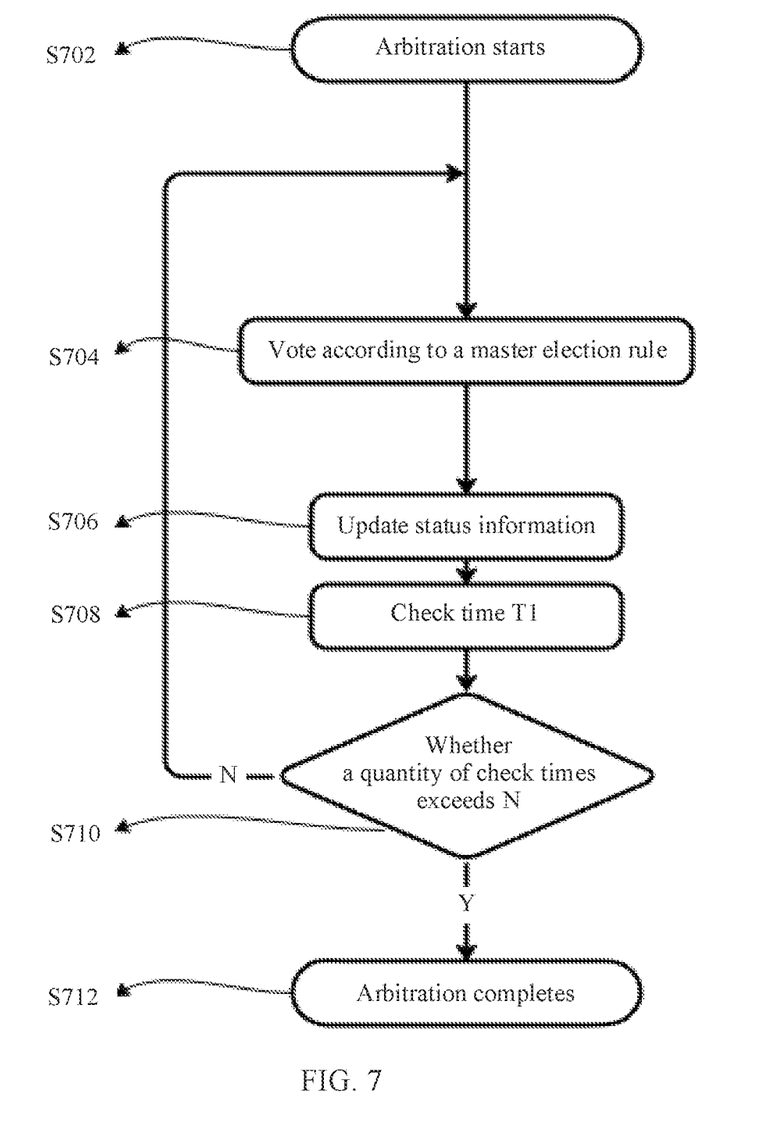
FIG. 7 is a flowchart of a method for selecting a service node in a primary status through arbitration according to an embodiment of this application.

Next, an arbitration process and an arbitration method are further explained. An objective of arbitration is to select a service node to enter a primary status, and manage an entire computer device. FIG. 7 is a flowchart of a method for selecting a service node to enter a primary status through arbitration according to an embodiment of this application.

According to step S702 of the procedure, arbitration starts to be performed on a service node that enters an arbitration state.

According to step S704 of the procedure, according to a selection rule, each service node or each service node that enters the arbitration state votes, then counts a number of votes, and synchronizes the number of votes to each service node that enters the arbitration state. When any service node has the highest number of votes, the service node enters the primary status, and entering the primary status means that the service node manages the entire computer device. When a plurality of service nodes has the same number of votes, slot numbers of the service nodes with the same number of votes are determined, and a service node with a smallest slot number is selected to enter the primary status, to manage the entire computer device. The slot number is a common concept in this field, is a number representing a specific physical location of a node, a module, a component, or the like in a computer device, and is in ascending order and is not repeated.

According to step S706 of the procedure, status information of each service node or each service node that enters the arbitration state is updated based on a result of voting according to a master election rule.

According to step S708 of the procedure, in a time period whose duration is T1, voting is performed for a plurality of times according to the master election rule, and the voting result and the status information of each service node or each service node that enters the arbitration state are checked. This is to repeatedly confirm a master election result and prevent noise interference. A check operation performed within a T1 period is one check operation.

According to step S710 of the procedure, when a quantity of check times exceeds a preset value N, step S712 is performed; or when the quantity of check times does not exceed the preset value N, step S704 is performed, where N is a positive integer.

According to step S712 of the procedure, the arbitration operation and the procedure are completed, and a service node is finally determined to enter the primary status.

According to the foregoing method, the service node that enters the primary status can be accurately and stably selected. However, in a voting process, some exceptions may occur. For example, a communication link between some nodes is faulty, and status information of the nodes cannot be synchronized to each service node. Therefore, in this scenario, a follow voting mechanism is required to resolve a problem that status information of other service nodes cannot be obtained, so as to ensure that these service nodes are still capable of voting for the other service nodes.

Figure 8:
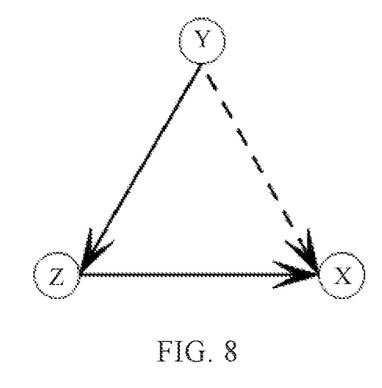
FIG. 8 is a schematic diagram of a structure of follow voting according to an embodiment of this application.

FIG. 8 is a schematic diagram of a structure of follow voting according to an embodiment of this application. For example, there are three service nodes X, Y, and Z. When a link between the service node X and the service node Y is faulty, the service node X cannot obtain status information of the service node Y. Therefore, the service node X votes for the service node Y according to a conventional method. Therefore, in this scenario, the status information of the service node Y may be transferred to the service node X through the service node Z. In this way, the service node X is capable of voting for the service node Y, and synchronizes a voting result to the service node Y through the service node Z. It may be easily understood that, in a scenario in which more link faults occur in a computer device having more service nodes, status information of each service node may still be transferred to each service node through link communication between intermediate nodes, and a voting result of each service node is synchronized to each service node in the same way.

Figure 9:
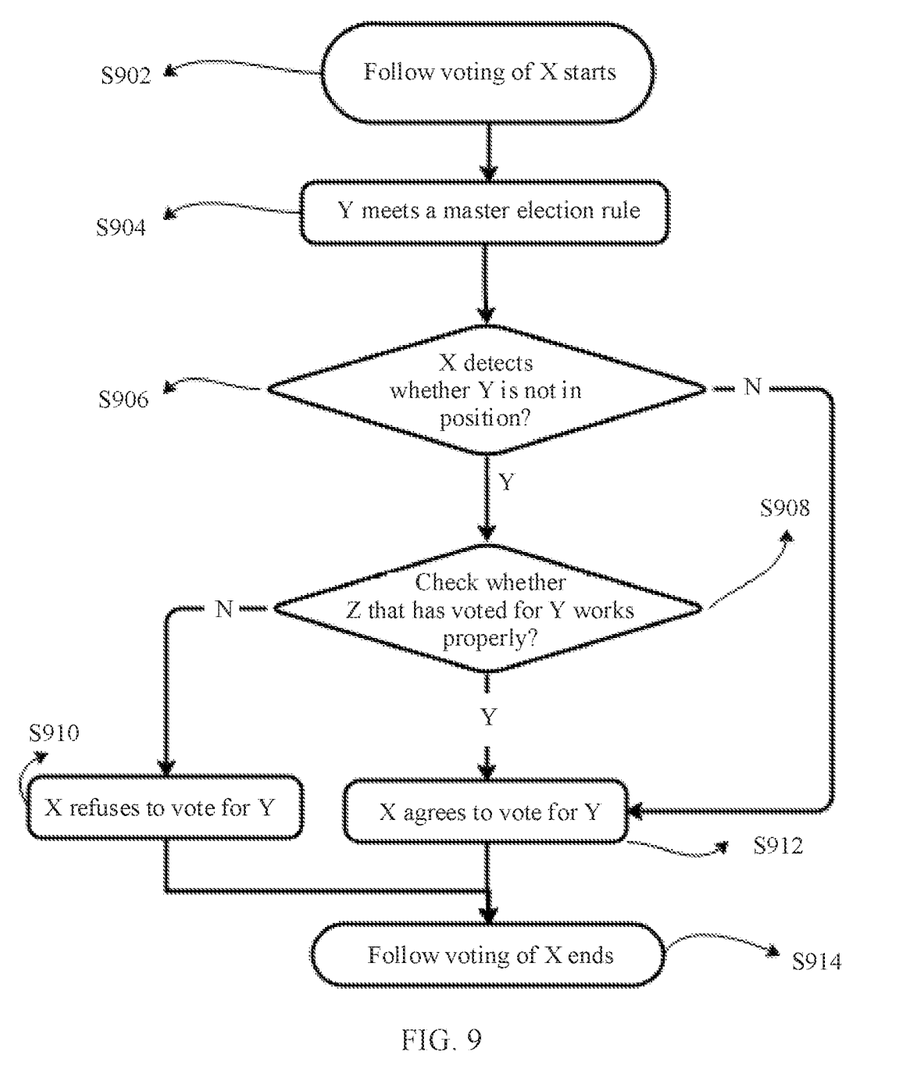
FIG. 9 is a flowchart of a follow voting method according to an embodiment of this application.

Further, FIG. 9 describes a flowchart of a follow voting method according to an embodiment of this application, and describes a follow voting mechanism in detail.

According to step S902 of the procedure, a follow voting process of a service node X starts.

According to step S904 of the procedure, a service node Y meets a master election rule. The master election rule has been described in detail above, and details are not described herein again.

According to step S906 of the procedure, it is determined whether the service node Y is not in position. If the service node X detects that status information of the service node Y cannot be directly obtained, a determining result is that the service node Y is not in position, and step S908 is performed; or if the service node X detects that status information of the service node Y is directly obtained, a determining result is that the service node Y is in position, and step S912 is performed.

According to step S908 of the procedure, it is detected whether a service node Z that has voted for the service node Y works properly. If the service node Z works properly, step S912 is performed; or if the service node Z does not work properly, step S910 is performed. It should be further explained that when it is detected that the service node Z does not work properly, a vote that has been cast to the service node Y is invalid.

According to step S910 of the procedure, because the service node Z is abnormal, the service node X cannot determine the status information of the service node Y, and therefore the service node X refuses to vote for the service node Y.

According to step S912 of the procedure, because the service node Z works properly, and the service node X can obtain and determine the status information of the service node Y, the service node X agrees to vote for the service node Y.

According to step S914 of the procedure, after the service node X agrees or refuses to vote for the service node Y, the follow voting process of the service node X ends.

According to the foregoing technical solution, when status information and voting results of some service nodes cannot be directly transferred to each service node, the status information and voting results of these service nodes are transferred to each service node through an intermediate service node by using an indirect method. For example, in this embodiment, the service node Z is an intermediate node between the service node X and the service node Y.

It should be understood that, function modules in embodiments of the present invention may be integrated into one processing module, or each of the modules may exist alone physically, or two or more modules are integrated into one module. The integrated module may be implemented in a form of hardware, or may be implemented in a form of hardware in addition to a software function module.

Computer instructions of the foregoing module implemented in a form of a software function module may be stored in a computer-readable storage medium. The software function module is stored in a storage medium and includes several instructions for instructing a computer device (which may be a personal computer, a server, or a network device) to perform some of the steps of the methods described in embodiments of the present invention. The foregoing storage medium may be a readable nonvolatile storage medium, including: any medium that can store program code, such as a removable hard disk, a read-only memory (ROM), a random access memory (RAM), a magnetic disk, or an optical disc.

Finally, it should be noted that the foregoing embodiments are intended for describing the technical solutions of the present invention, but not for limiting the present invention. Although the present invention is described in detail with reference to the foregoing embodiments, persons of ordinary skill in the art should understand that they may still make modifications to the technical solutions recorded in the foregoing embodiments or make equivalent replacements to some technical features thereof, without departing from the scope of the claims.

What is claimed is:

1. A computer device comprising:
a subrack common component and a plurality of service nodes, wherein each of the plurality of service nodes comprises a baseboard management controller (BMC) directly connected to the subrack common component and is configured to directly manage the subrack common component when being in a primary status.

2. The computer device according to claim 1, wherein the BMC is further configured to manage the plurality of service nodes when being in the primary status.

3. The computer device according to claim 1, wherein the BMC is further configured to run a first management submodule and a second management submodule, wherein the first management submodule is configured to manage and run the respective service node, wherein a state of the second management submodule comprises a working state and a standby state, and wherein the second management submodule is configured to manage the subrack common component and a service node other than the service node when in the working state.

4. The computer device according to claim 3, wherein when the second management submodule is in the working state, the BMC of the service node is in the primary status, and wherein when the second management submodule is in the standby state, the BMC of the service node is in a secondary status.

5. The computer device according to claim 1, wherein BMCs of any two service nodes in the plurality of service nodes are connected to each other, and any service node in the plurality of service nodes is accessed by a user to manage the computer device.

6. The computer device according to claim 1, wherein each service node further comprises a logic circuit, logic circuits of any two service nodes in the plurality of service nodes are connected to each other, and the logic circuit is configured to obtain status information of the plurality of service nodes.

7. The computer device according to claim 6, wherein the logic circuit comprises: a complex programmable logic device (CPLD), a local area network switching device, or a controller area network CAN circuit.

8. The computer device according to claim 7, wherein the logic circuits of any two service nodes in the plurality of service nodes are connected to each other based on full interconnection or bus interconnection.

9. The computer device according to claim 1, wherein the plurality of service nodes are further configured to: when no BMC of a service node in the plurality of service nodes is in the primary status, select a BMC of a service node to enter the primary status according to a master election rule.

10. The computer device according to claim 1, wherein the plurality of service nodes are further configured to: when the respective service node to which the BMC in the primary status belongs is abnormal or when the BMC of the respective service node in the primary status applies for state switching, select a BMC of a service node to enter the primary status according to a master election rule.

11. A management method for a computer device that comprises a subrack common component and a plurality of service nodes, the managing method comprising:

directly managing, by a BMC of any service node in a plurality of service nodes, a subrack common component when the BMC is in a primary status, wherein each of the plurality of service nodes comprises a BMC directly connected to the subrack common component.

12. The management method according to claim 11, comprising:
managing, by the BMC of any service node in the plurality of service nodes, the plurality of service nodes.

13. The management method according to claim 11, comprising:
running, by the BMC, a first management submodule and a second management submodule, wherein the first management submodule manages the respective service node wherein a state of the second management submodule comprises a working state and a standby state, and wherein the second management submodule is configured to manage the subrack common component and a service node other than the service node when in the working state.

14. The management method according to claim 13, wherein when the second management submodule is in the working state, the BMC of the service node is in the primary status, and wherein when the second management submodule is in the standby state, the BMC of the service node is in a secondary status.

15. The management method according to claim 11, wherein BMCs of any two service nodes in the plurality of service nodes are connected to each other, and are accessed through any service node in the plurality of service nodes to manage the computer device.

16. The management method according to claim 11, wherein each service node further comprises a logic circuit, logic circuits of any two service nodes in the plurality of service nodes are connected to each other, and the logic circuit obtains status information of the plurality of service nodes.

17. The management method according to claim 11, comprising: when no BMC of a service node in the plurality of service nodes is in the primary status, selecting a BMC of a service node to enter the primary status according to a master election rule.

18. The management method according to claim 11, comprising: when the respective service node to which the BMC in the primary status belongs is abnormal or when the BMC of the respective service node in the primary status applies for state switching, selecting a BMC of a service node to enter the primary status according to a master election rule.

19. The management method according to claim 18, wherein the master election rule comprises: if statistics on votes are collected, a service node that obtains a largest quantity of votes enters the primary status; and if a same quantity of votes are obtained, a service node that has a smallest slot number enters the primary status.

20. A computer device comprising a subrack common component and a plurality of service nodes, wherein each service node comprises a baseboard management controller (BMC) directly connected to the subrack common component, and wherein the BMC of any service node in the plurality of service nodes is configured to perform operations comprising:
directly managing the subrack common component when the BMC is in a primary status.

* * * * *